UNITED STATES PATENT OFFICE.

EDWIN J. LARKIN, OF NEW ORLEANS, LOUISIANA, ASSIGNOR TO AIRLESS TUBE FILLER COMPANY, OF NEW ORLEANS, LOUISIANA, A CORPORATION OF LOUISIANA.

PRINTER'S ROLLER COMPOSITION AND METHOD OF MAKING THE SAME.

1,049,878.  Specification of Letters Patent.   Patented Jan. 7, 1913.

No Drawing.   Application filed May 18, 1912.   Serial No. 698,343.

*To all whom it may concern:*

Be it known that I, EDWIN J. LARKIN, a citizen of the United States, residing at New Orleans, in the parish of Orleans and State of Louisiana, have invented new and useful Improvements in Printers' Roller Composition and Methods of Making the Same, of which the following is a specification.

This invention relates to a novel and improved composition for printers' ink rollers, and for kindred purposes, the object of the invention being to provide a composition of the character and method of manufacturing the same whereby a superior composition is produced.

The composition consists, essentially, of a combination of dextrin, glue, glycerin and sodium dichromate or chromate of potash, together with a suitable retarder and solvent for the chrome salt or compound, such as molasses, and, if desired, a proportion of crude rubber. These ingredients are mixed together in suitable proportions, preferably about one part of the dextrin, to two parts of the glue and two parts of the glycerin. To each five pounds of the above mixture is added two ounces of sodium dichromate or chromate of potash, dissolved in about one quart of molasses or its equivalent. In addition I may employ to each eighteen pounds of the resultant compound one pound of crude Pará rubber dissolved in benzin or any of the ordinary solvents.

In preparing the composition for use, the glue is softened to a sufficient degree by immersing it for about one and one-half minutes in a water bath, then dissolved in the hot glycerin, and the mixture then cooked until the water taken up by the glue is driven off. The dextrin is then added and thoroughly stirred in and the mixture cooked for a period of about thirty minutes or until it is of the proper consistency. If the rubber is to be omitted, the chrome salt, dissolved in the molasses, is added to the mixture and the latter then molded into the desired form without pressure. If the rubber is used, it is incorporated with the mixture before the addition of the chrome salt and its solvent, stirred thoroughly in and the mixture cooked until all the solvent and any moisture that may be contained therein are driven off, after which the chrome salt and its solvent are added and the composition molded as described.

If desired, gelatin may under some conditions be substituted for the glue and an additional amount of hot glycerin employed as the chrome salt solvent and retarding agent, although in this connection molasses is preferred, as it gives greater efficiency. The chrome salt or compound acts as usual as a setting agent and to keep the roll from melting under friction and heat and also to render the composition insoluble in water or any of the ordinary volatile solvents, while the glycerin gives the desired amount of elasticity and resiliency. While chromate of potash or other chrome salts or compounds may be used, sodium dichromate is preferred. Sodium dichromate, unlike chromate of potash or bichromate of potash, commonly used in other compositions, gives all the results of the two former, but unlike them it renders the product practically free from the effects of water and moisture when employed in the combination and under the method of manufacture above described. The dextrin in this particular composition is of importance, in that it gives a fine and smooth texture and velvety softness to the composition, rendering the roller compound capable of accommodating itself accurately to all surfaces of the type form and of producing a desirable vacuum ink take-up action for the uniform distribution of the ink over the roll and type form. The molasses, in addition to serving as a solvent for the chrome salt or compound, checks or retards the action of the chromate to a sufficient degree to permit the composition to be molded.

While the use of rubber in the composition is preferred, the composition prepared without the rubber is superior to the roller compositions heretofore used in that it is uninflammable and will not melt under heat or friction, and consequently is adapted for either summer or winter use and when prepared in the manner described may be used immediately without being seasoned and will not shrink. Another desirable advantage is that the composition is not affected by the cleansing agents commonly employed in removing ink from the roll or by copying inks, which harden and coat ordinary rolls and prevent their use in connection with ordinary inks. Furthermore, the composition possesses a fineness of texture and velvety delicateness of action not possessed by any of the roller compositions heretofore employed.

The rubber when used acts as an additional binder, adds tensile strength and toughness to the composition and prevents it from checking or cracking under climatic and temperature changes. But a small proportion of rubber is required for this purpose in this composition, as by the use of the specified ingredients and their mode of combination the rubber thoroughly permeates the product and binds the particles together throughout the mass. It also coacts with the chromate as a moisture resistant.

I claim:—

1. A roller composition formed from dextrin, glue or gelatin, glycerin, a chromate, and a solvent therefor adapted to act as a retardant to the setting of the mass.

2. A roller composition formed from dextrin, glue or gelatin, glycerin, sodium dichromate, and a solvent therefor adapted to act as a retardant to the setting of the mass.

3. A roller composition formed from dextrin, glue or gelatin, glycerin, a chromate, and molasses, the last acting as a solvent for the chromate and retardant to the setting of the mass.

4. A roller composition formed from dextrin, glue or gelatin, glycerin, sodium dichromate, and molasses in quantity to act as a solvent for the dichromate and retardant to the setting of the mass.

5. A roller composition formed from dextrin, glue or gelatin, glycerin, crude rubber, and a chromate dissolved in a retardant vehicle.

6. A roller composition formed from dextrin, glue or gelatin, glycerin, sodium dichromate dissolved in a retardant vehicle, and crude rubber.

7. A roller composition formed from dextrin, glue or gelatin, glycerin, sodium dichromate, and a sufficient amount of molasses to serve as a vehicle for the dichromate and a retardant to the setting of the mass.

8. The herein described process of making a printing roller composition, which consists in dissolving glue or gelatin in glycerin and cooking the same to a desired degree, adding dextrin and cooking the mass, and then incorporating therewith a chromate dissolved in a retarding vehicle.

9. The herein described process of making a printing roller composition, which consists in dissolving glue or gelatin in glycerin and cooking the same to a desired degree, adding dextrin and cooking the mass, and then incorporating therewith dichromate of soda dissolved in a retarding vehicle.

10. The herein described process of making a printing roller composition, which consists in dissolving glue or gelatin in glycerin and cooking the same to a desired degree, adding dextrin and cooking the mass, adding thereto crude rubber dissolved in a suitable solvent, heating the mass, and then adding thereto a chromate dissolved in a retarding vehicle.

11. The herein described process of making a printing roller composition, which consists in dissolving glue or gelatin in glycerin and cooking the same to a desired degree, adding dextrin and cooking the mass, adding thereto crude rubber dissolved in a suitable solvent, heating the mass, and then adding thereto sodium dichromate dissolved in molasses.

In testimony whereof I affix my signature in presence of two witnesses.

EDWIN J. LARKIN.

Witnesses:
C. C. HINES,
BENNETT S. JONES.